(12) United States Patent
Reineke et al.

(10) Patent No.: US 11,366,693 B2
(45) Date of Patent: Jun. 21, 2022

(54) SYSTEM AND METHOD FOR DEPLOYMENT INTERFACE

(71) Applicant: EMC IP Holding Company LLC, Hopkinton, MA (US)

(72) Inventors: Nicole Reineke, Northborough, MA (US); James Robert King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 45 days.

(21) Appl. No.: 16/727,705

(22) Filed: Dec. 26, 2019

(65) Prior Publication Data

US 2021/0200588 A1    Jul. 1, 2021

(51) Int. Cl.
*G06F 9/50* (2006.01)
*G06F 3/04883* (2022.01)
*G06T 11/20* (2006.01)
*G06F 16/904* (2019.01)

(52) U.S. Cl.
CPC ........ *G06F 9/5005* (2013.01); *G06F 3/04883* (2013.01); *G06F 16/904* (2019.01); *G06T 11/206* (2013.01)

(58) Field of Classification Search
CPC .................................................. G06F 9/5005
See application file for complete search history.

(56) References Cited

U.S. PATENT DOCUMENTS

| | | | |
|---|---|---|---|
| 10,101,819 B2 | 10/2018 | Trattler et al. | |
| 10,217,185 B1 | 2/2019 | Cabanero | |
| 10,447,546 B1 * | 10/2019 | Guo | ...................... G06F 11/301 |
| 10,929,011 B1 | 2/2021 | Reineke et al. | |
| 2005/0156715 A1 | 7/2005 | Zou et al. | |
| 2006/0129691 A1 | 6/2006 | Coffee et al. | |
| 2007/0043860 A1 * | 2/2007 | Pabari | ................. H04L 41/0886 709/224 |
| 2008/0086391 A1 | 4/2008 | Maynard et al. | |
| 2009/0216438 A1 | 8/2009 | Shafer | |
| 2013/0218890 A1 | 8/2013 | Fernandes et al. | |
| 2014/0372907 A1 | 12/2014 | Lee et al. | |
| 2015/0304169 A1 | 10/2015 | Milman et al. | |
| 2016/0103494 A1 * | 4/2016 | Zehler | ................. H04L 41/0803 358/1.15 |
| 2016/0343093 A1 | 11/2016 | Riland et al. | |

(Continued)

OTHER PUBLICATIONS

Washington University in St. Louis; "Enabling 'internet of photonic things' with miniature sensors"; ScienceDaily; Sep. 12, 2018. (www.sciencedaily.com/releases/2018/09/180912144403.htm).

*Primary Examiner* — Roland J Casillas
(74) *Attorney, Agent, or Firm* — Chamberlain, Hrdlicka, White, Williams & Aughtry

(57) ABSTRACT

A system for managing a deployment includes storage for storing an enhanced asset map of the deployment. The system further includes a deployment manager that obtains a deployment interface request for the deployment; in response to obtaining the deployment interface request: displays a visualization including at least one interactive element, the visualization is based on the deployment interface request and the enhanced asset map; obtains input associated with the at least one interactive element using a natural motion interface; and performs an action set, based on the input, to update an operation of the deployment.

13 Claims, 17 Drawing Sheets

(56) References Cited

U.S. PATENT DOCUMENTS

| | | | |
|---|---|---|---|
| 2017/0024378 A1 | 1/2017 | Sharma et al. | |
| 2017/0066459 A1 | 3/2017 | Singh | |
| 2017/0109422 A1 | 4/2017 | Satkunarajah et al. | |
| 2017/0374519 A1 | 12/2017 | Hewitt et al. | |
| 2018/0090992 A1 | 3/2018 | Shrivastava et al. | |
| 2018/0129276 A1 | 5/2018 | Nguyen et al. | |
| 2018/0270120 A1 | 9/2018 | Tung et al. | |
| 2019/0108756 A1 | 4/2019 | Gillingham | |
| 2019/0332374 A1* | 10/2019 | Harner | G06F 8/10 |
| 2019/0386891 A1* | 12/2019 | Chitalia | H04L 41/22 |
| 2020/0090109 A1 | 3/2020 | Dozortsev et al. | |
| 2020/0351345 A1 | 11/2020 | Bansod | |
| 2021/0004757 A1 | 1/2021 | Serhan | |

* cited by examiner

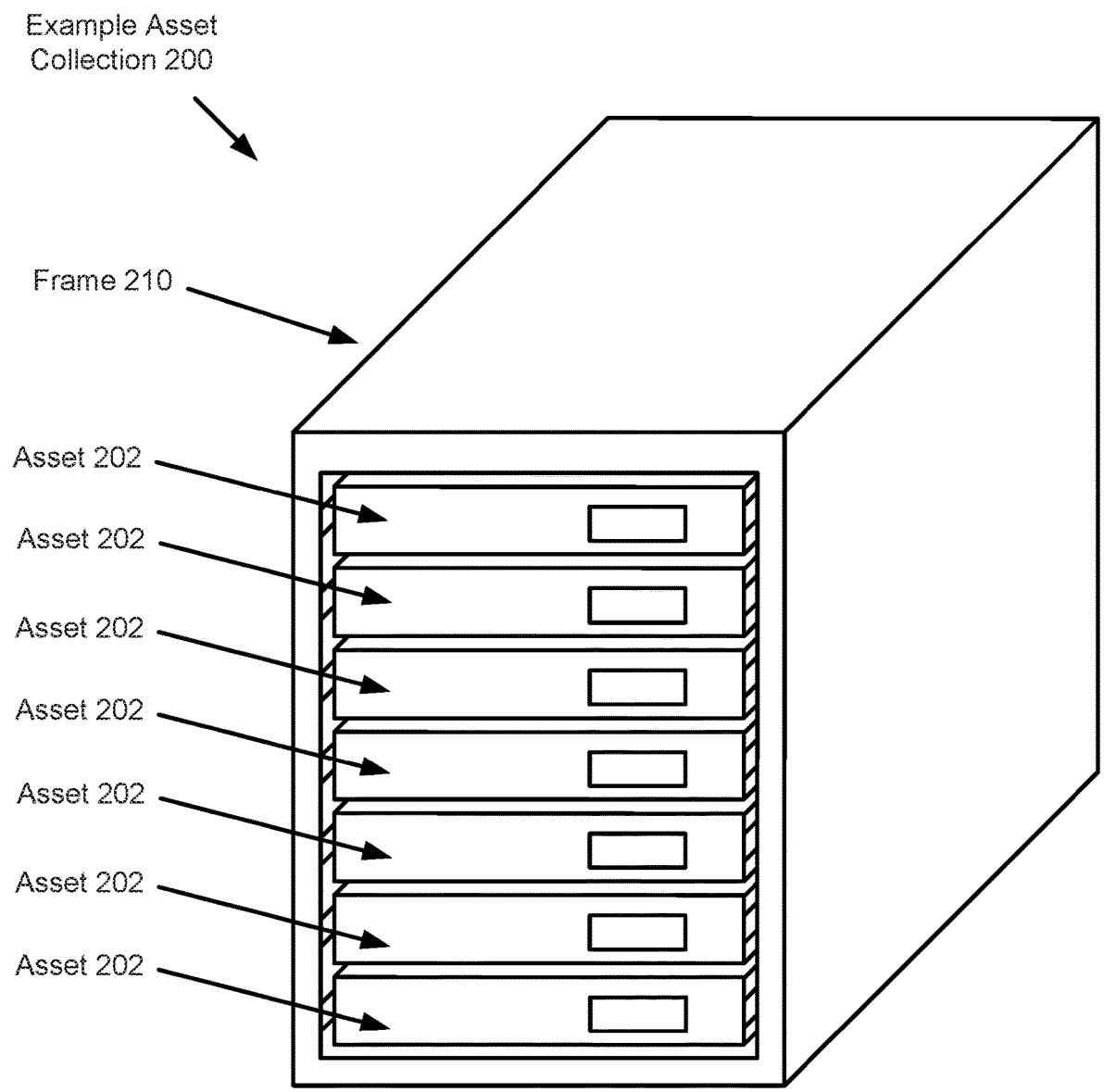
FIG. 2.1

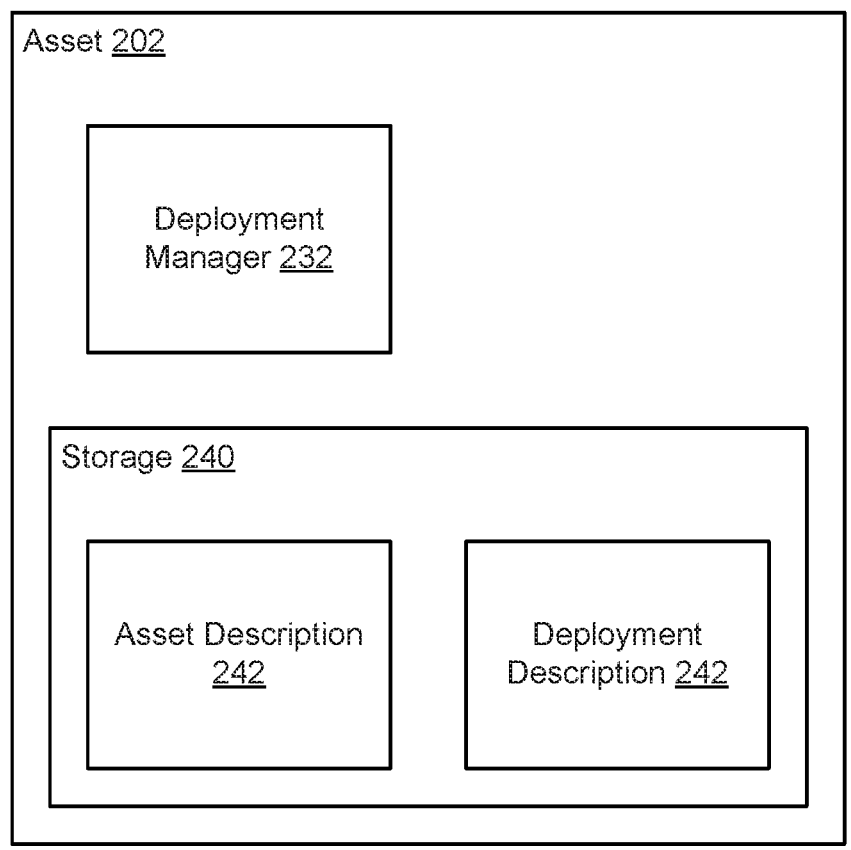
FIG. 2.2

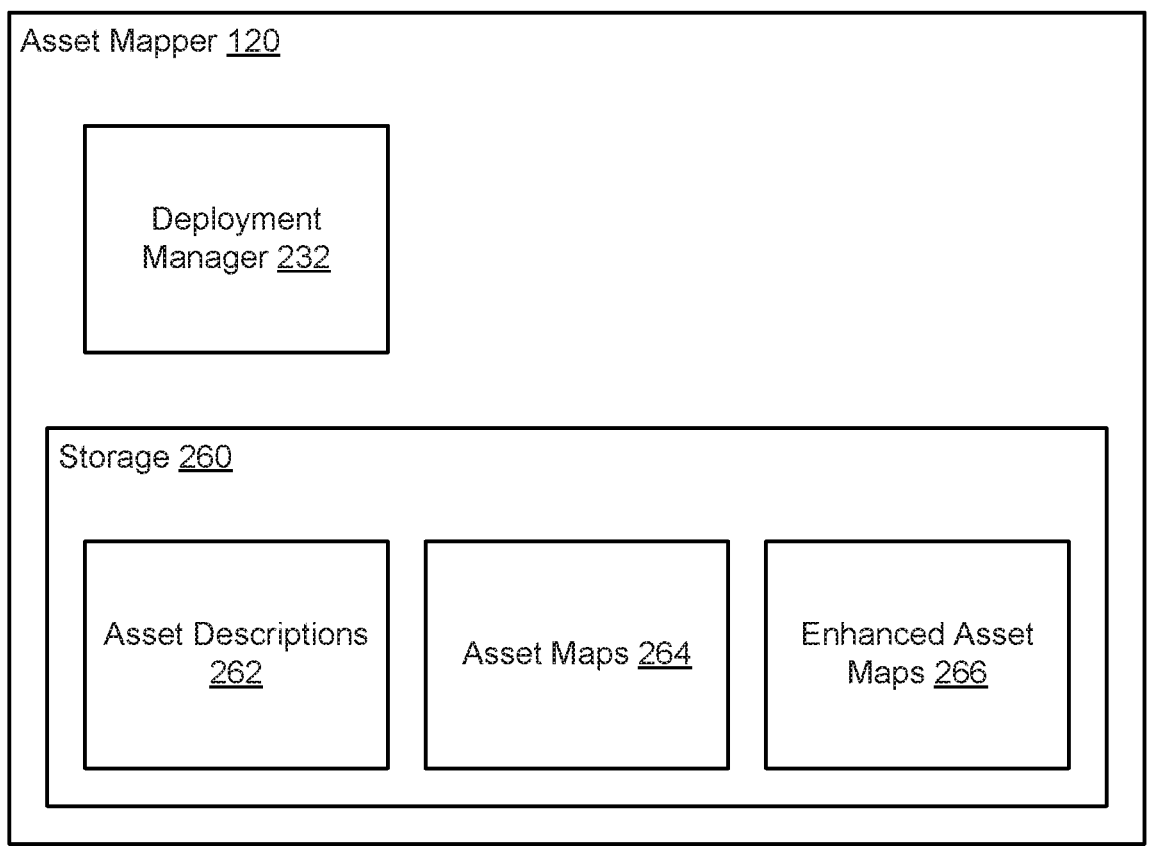
FIG. 2.3

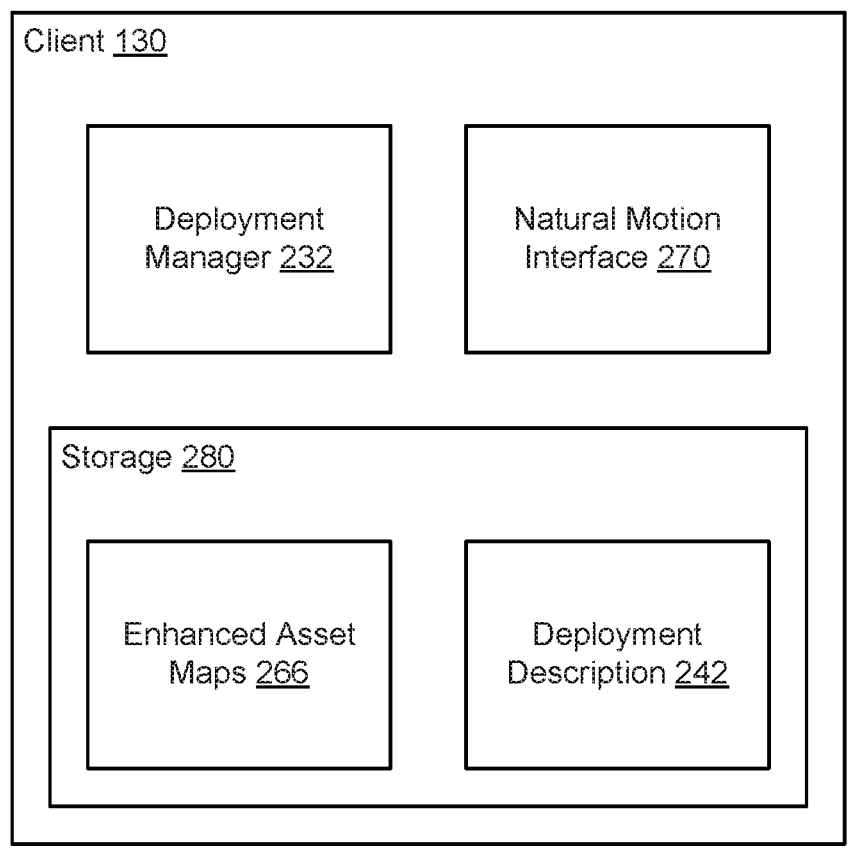
FIG. 2.4

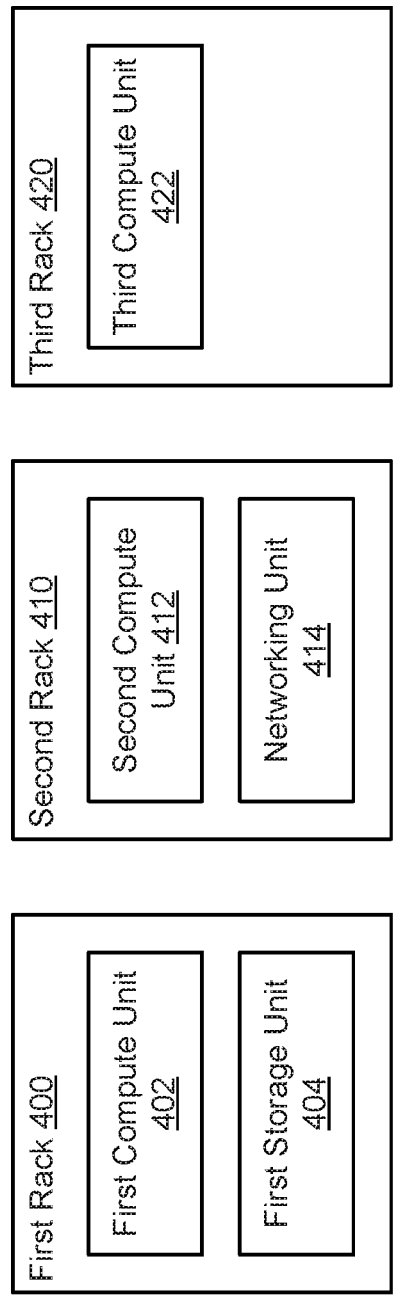
FIG. 4.1

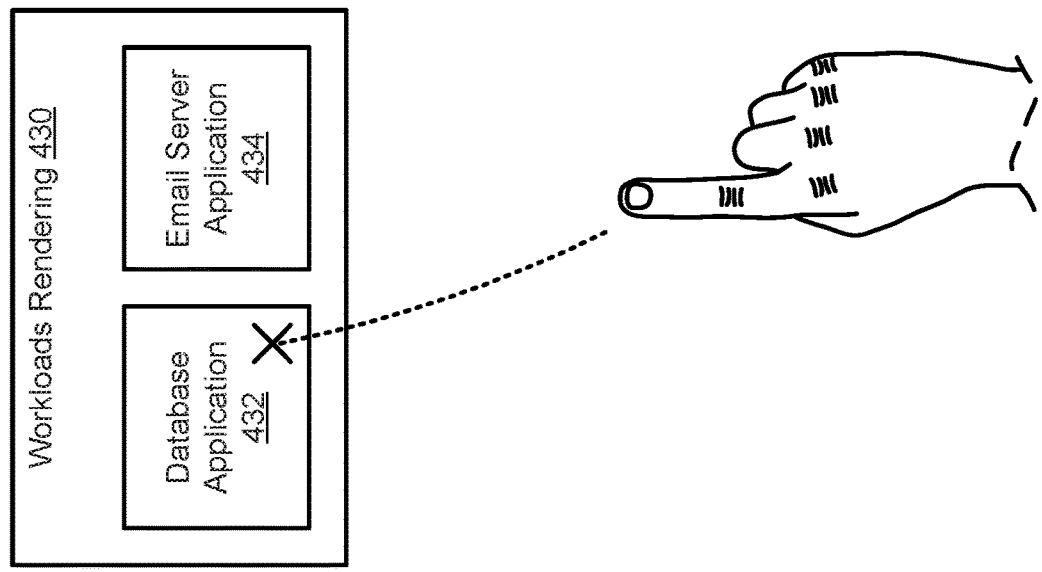
FIG. 4.2

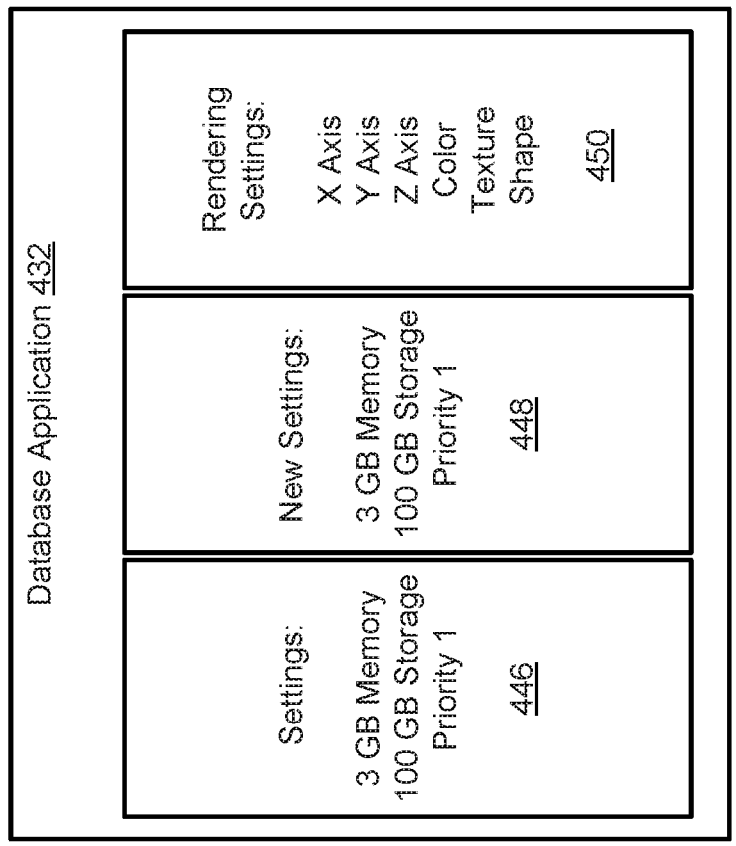
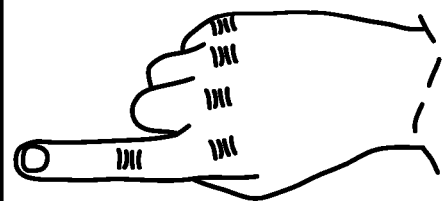
FIG. 4.3

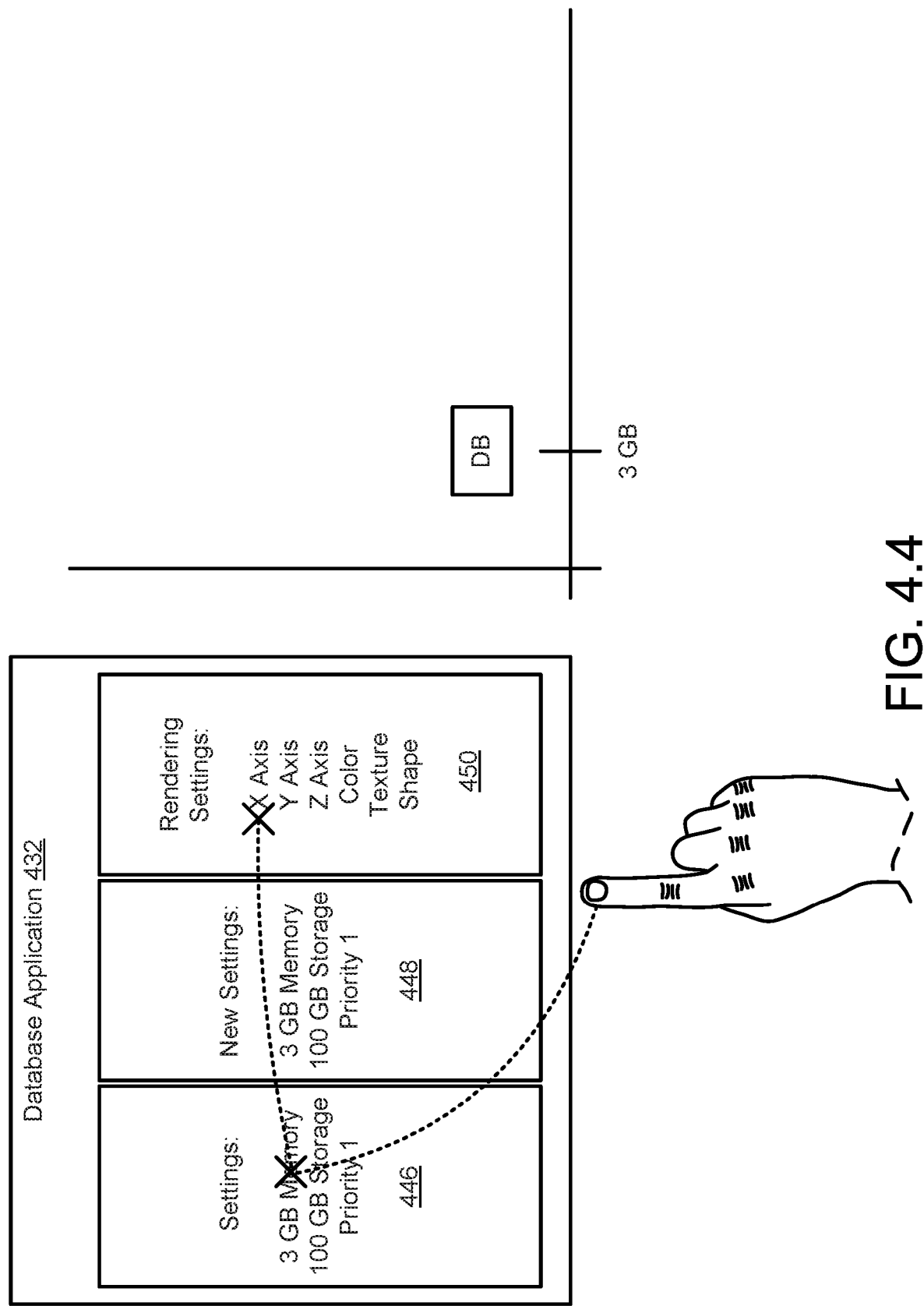
FIG. 4.4

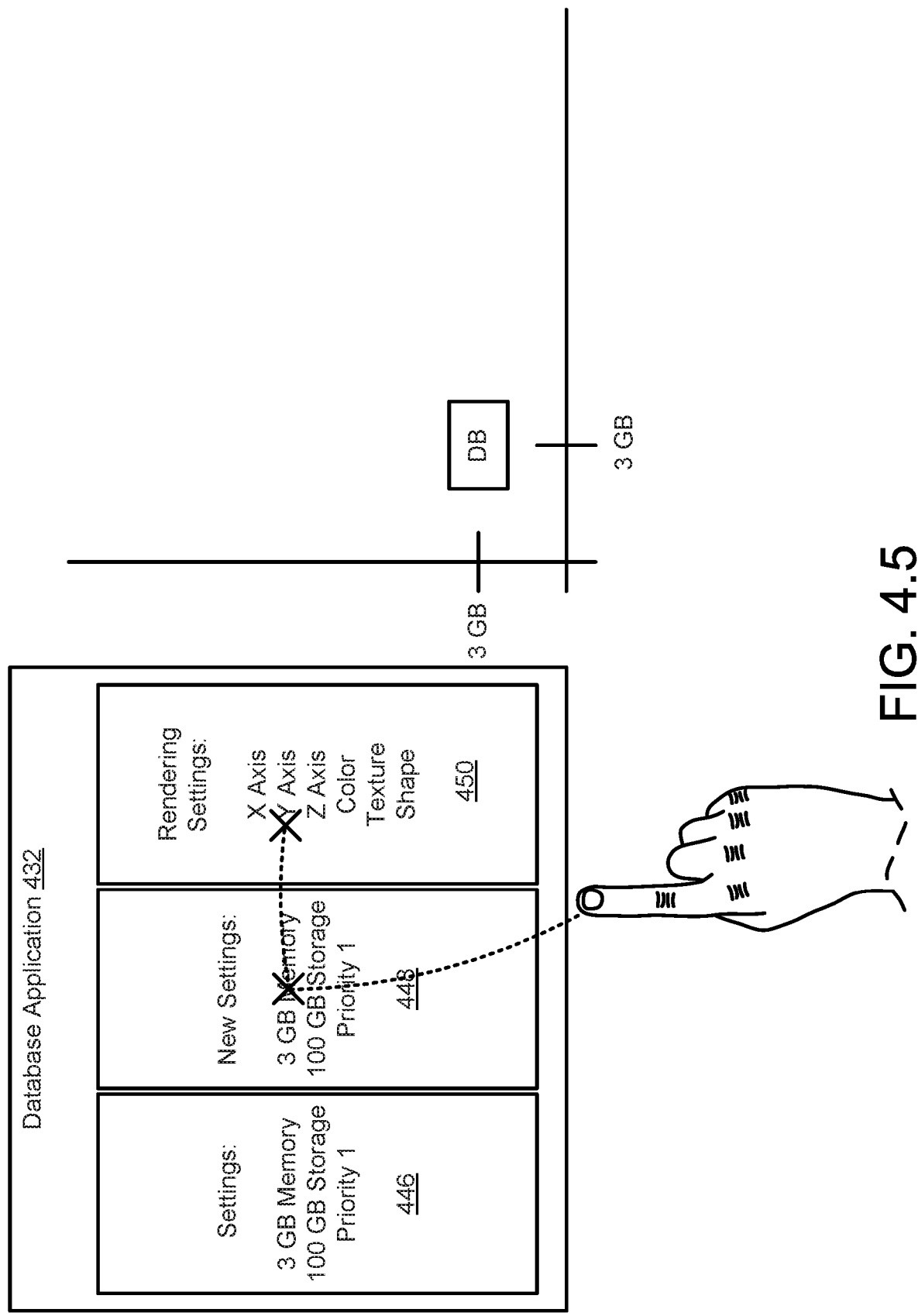

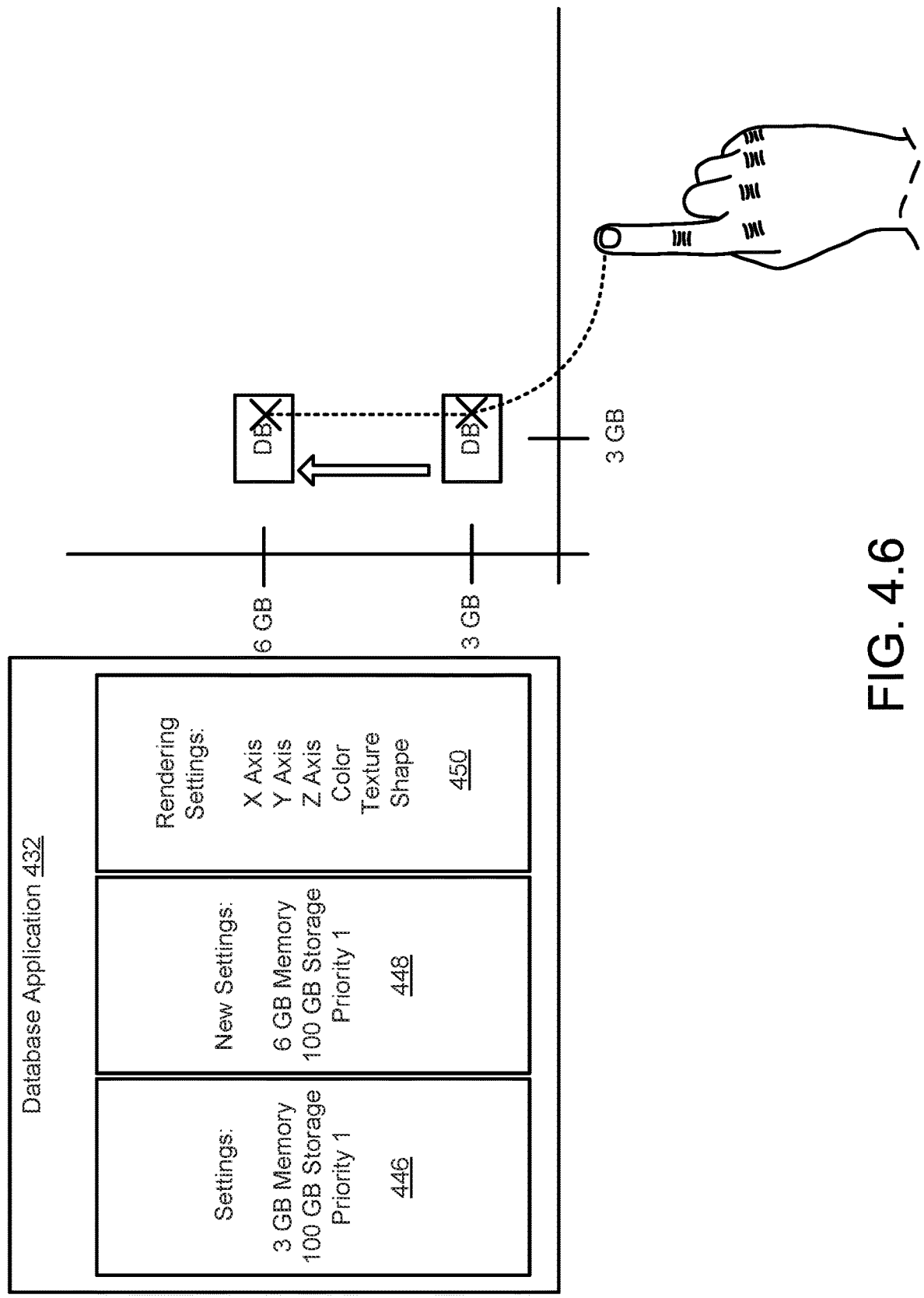
FIG. 4.6

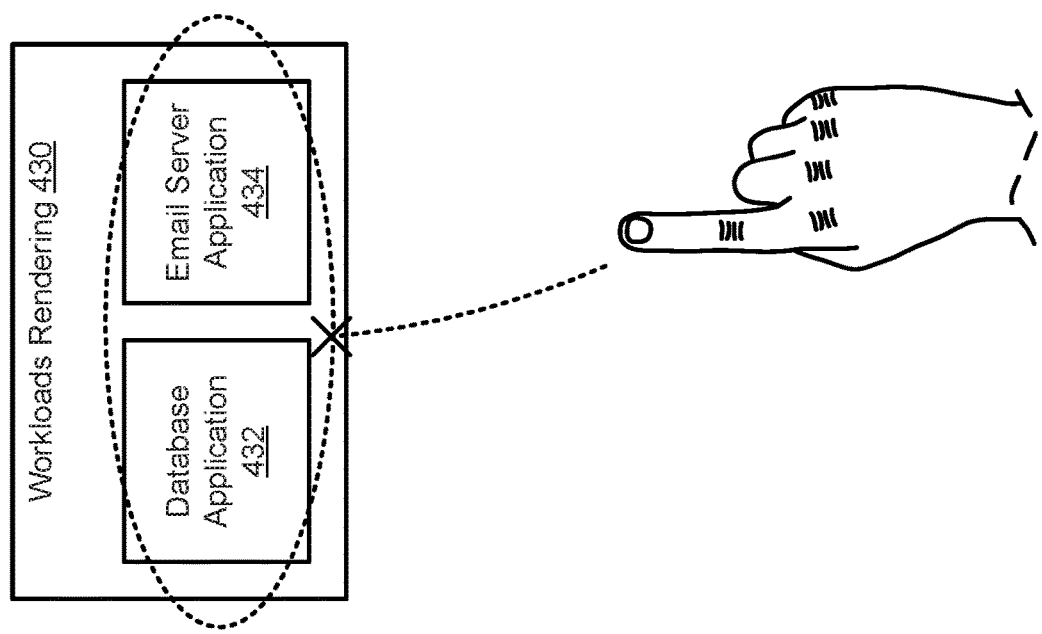
FIG. 4.7

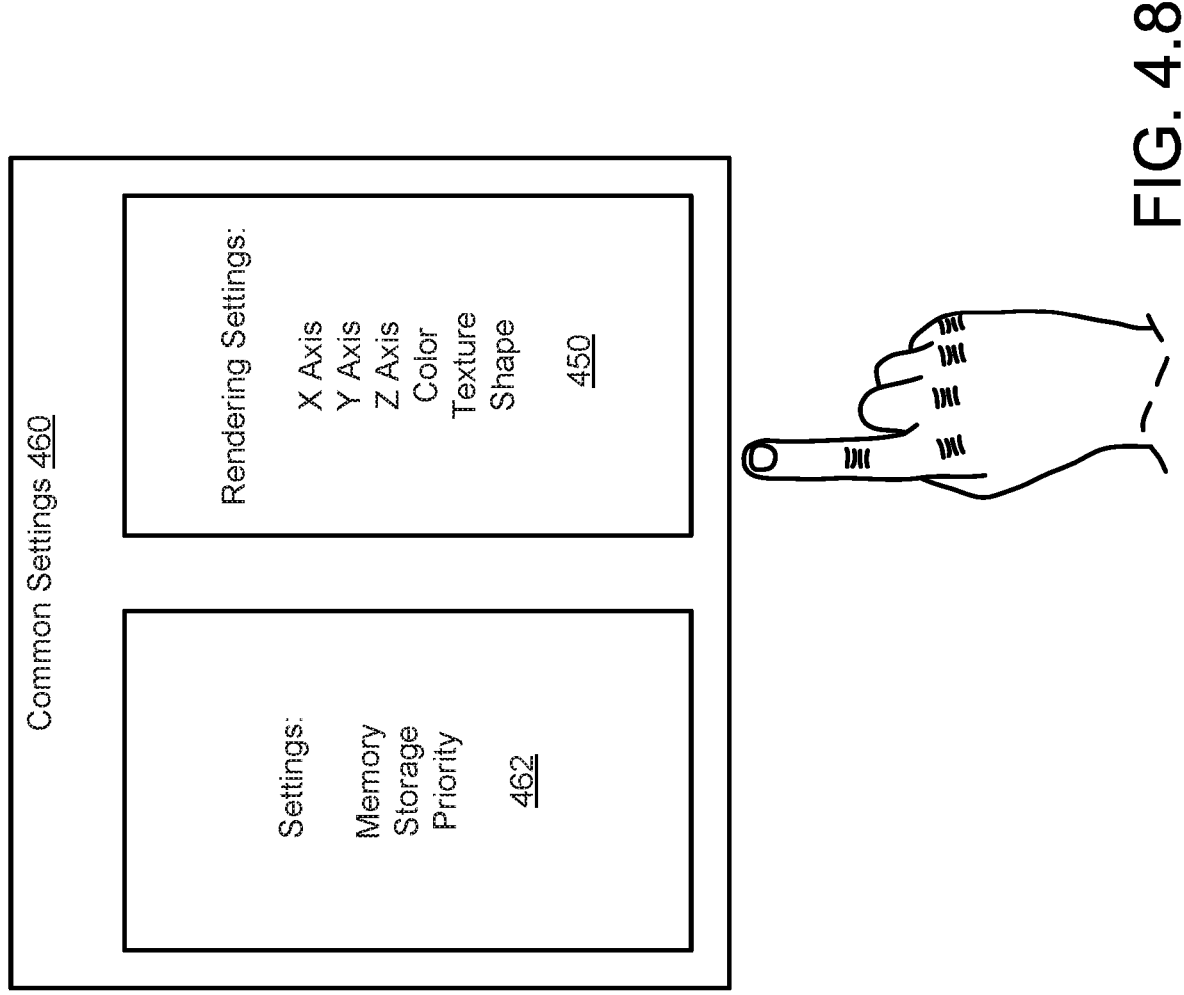
FIG. 4.8

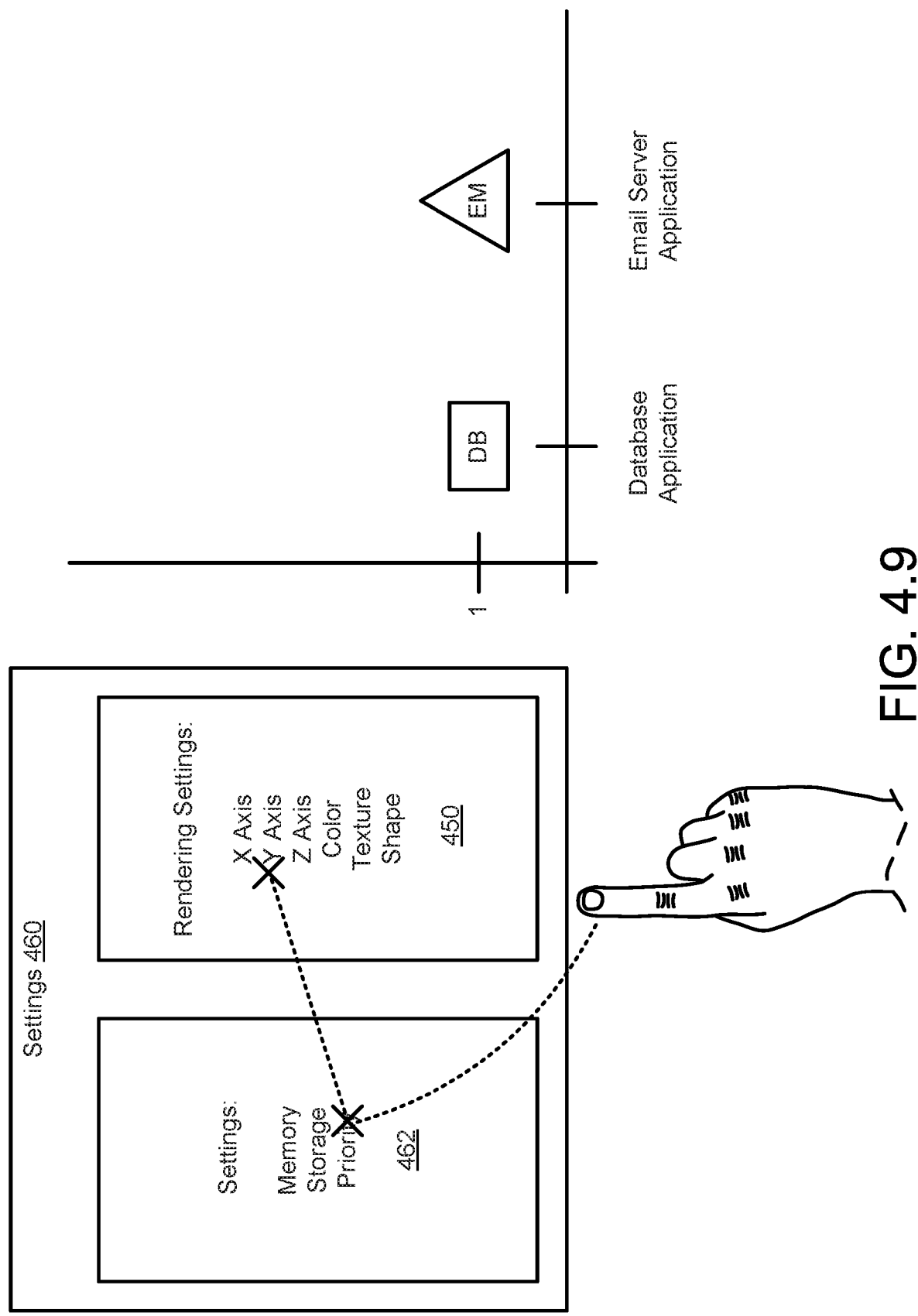
FIG. 4.9

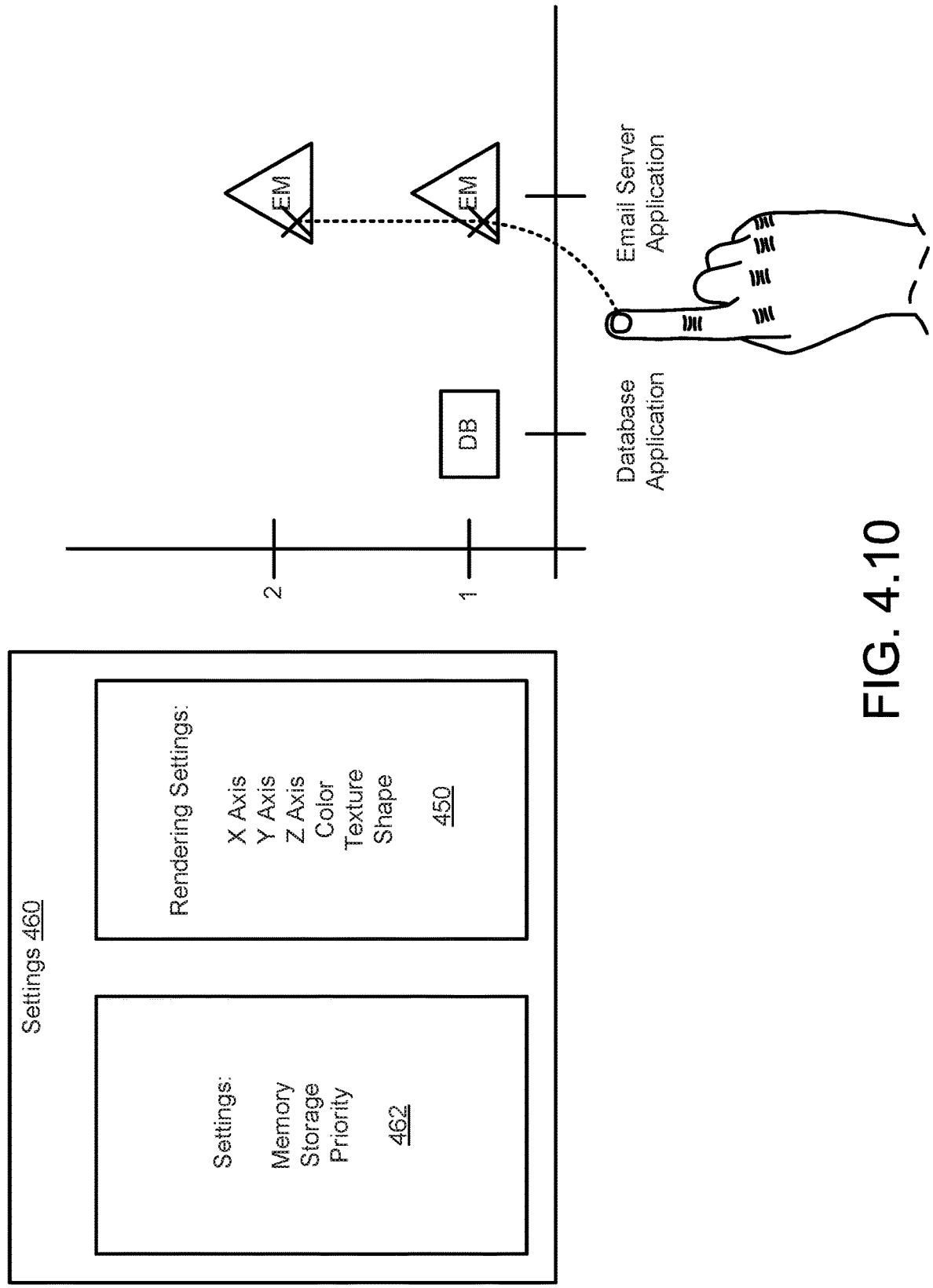
FIG. 4.10

SYSTEM AND METHOD FOR DEPLOYMENT INTERFACE

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, a system for managing a deployment in accordance with one or more embodiments of the invention includes storage for storing an enhanced asset map of the deployment. The system further includes a deployment manager that obtains a deployment interface request for the deployment; in response to obtaining the deployment interface request: displays a visualization including at least one interactive element, the visualization is based on the deployment interface request and the enhanced asset map; obtains input associated with the at least one interactive element using a natural motion interface; and performs an action set, based on the input, to update an operation of the deployment.

In one aspect, a method for managing a deployment in accordance with one or more embodiments of the invention includes obtaining a deployment interface request for the deployment; in response to obtaining the deployment interface request: displaying a visualization including at least one interactive element, the visualization is based on the deployment interface request and an enhanced asset map of the deployment; obtaining input associated with the at least one interactive element using a natural motion interface; and performing an action set, based on the input, to update an operation of the deployment.

In one aspect, non-transitory computer readable medium in accordance with one or more embodiments of the invention includes computer readable program code, which when executed by a computer processor enables the computer processor to perform a method for managing a deployment. The method includes obtaining a deployment interface request for the deployment; in response to obtaining the deployment interface request: displaying a visualization including at least one interactive element, the visualization is based on the deployment interface request and an enhanced asset map of the deployment; obtaining input associated with the at least one interactive element using a natural motion interface; and performing an action set, based on the input, to update an operation of the deployment.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example asset collection in accordance with one or more embodiments of the invention.

FIG. 2.2 shows a diagram of an asset in accordance with one or more embodiments of the invention.

FIG. 2.3 shows a diagram of an asset mapper in accordance with one or more embodiments of the invention.

FIG. 2.4 shows a diagram of a client in accordance with one or more embodiments of the invention.

FIG. 4.1 shows a diagram of an example system.

FIGS. 4.2-4.10 show diagrams of visualizations generated by the system of FIG. 4.1 and user input obtained via the visualizations.

DETAILED DESCRIPTION

Figure 1:
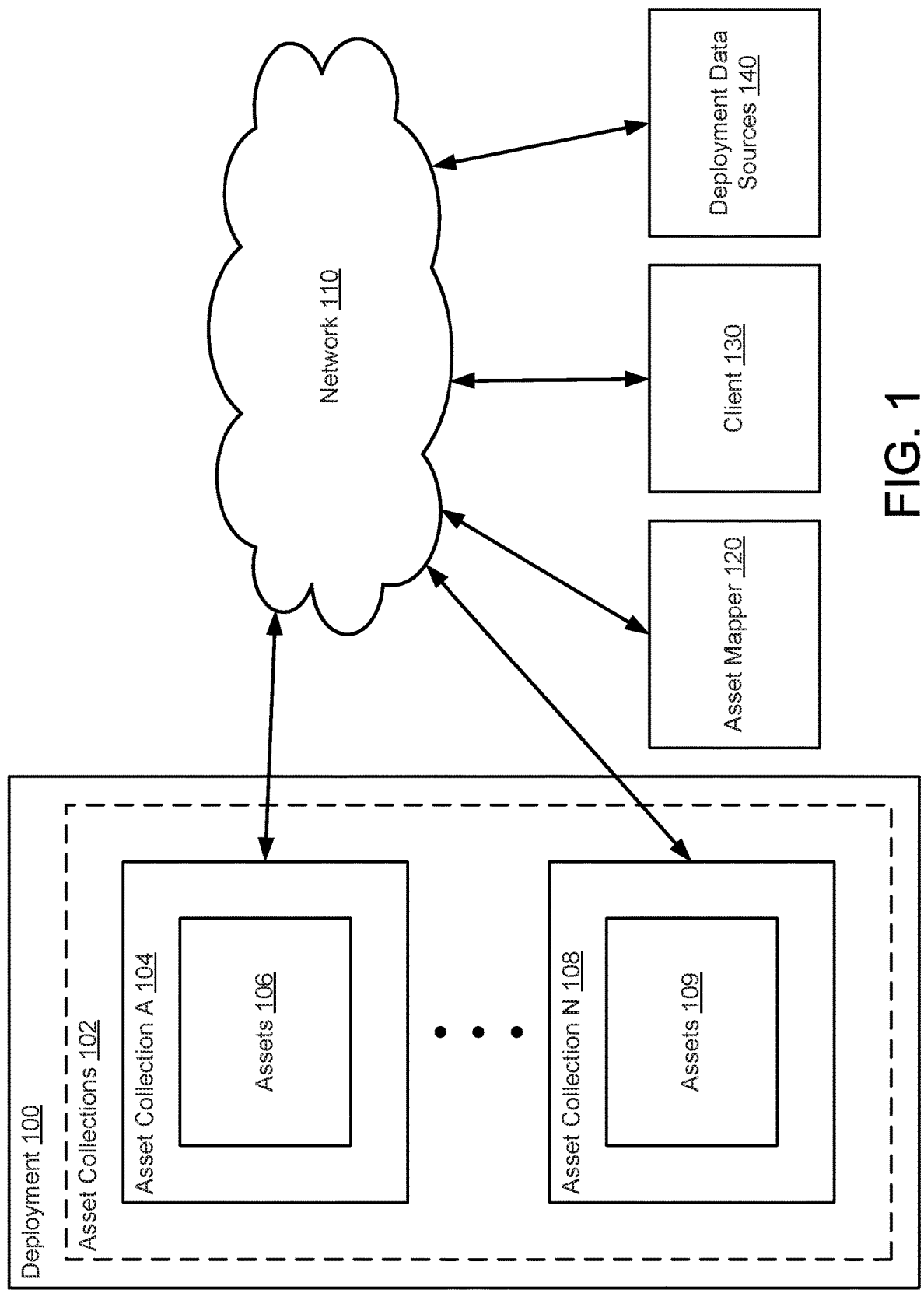
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing deployments. A deployment may include any number of assets. An asset may be a collection of hardware devices that hosts applications, performs workloads, and/or stores data. The assets of the deployment may cooperate to provide functionalities of the deployment.

To manage the deployment, the operation of individual assets of the deployment may need to be modified. For example, the allocation of computing resources of one or more of the assets may need to be modified to respond to changing conditions encountered by the deployment.

Embodiments of the invention may provide a method for dynamically generating visualizations of the operation of the deployment. The visualizations may include information regarding the allocation of resources of the assets, applications hosted by the assets, workloads being performed by the assets, and/or other types of information that may be used by a person to manage the deployment.

The dynamically generated visualizations may also be interactive and thereby enable users to modify the operation of the deployment based on its current operation. For example, when a current state of the operation of the deployment is displayed, a user may interact with the visualization to indicate a change to the operation of the deployment. The system may automatically enforce the aforementioned change across the deployment. By doing so, the cognitive burden on a person (e.g., an administrator) tasked by managing a deployment may be reduced.

FIG. 1 shows a system in accordance with one or more embodiments of the invention. The system may include a deployment (100) that provides computer implemented services. The computer implemented services may include, for example, database services, data storage services, electronic communications services, and/or other types of services that may be implemented using computing devices.

To provide the computer implemented services, the deployment (100) may utilize computing resources provided by hardware devices. The computing resources may include, for example, processing resources, storage resources, memory resources, and/or communications resources provided by the hardware devices.

The hardware devices of the deployment may be logically and/or physically divided into assets (106, 109). An asset may include a portion of the hardware devices of the deployment (100) and an enclosure for storing the portion of the hardware devices. An enclosure may be, for example, a rack mountable chassis or another type of form factor compliant enclosure. Different assets may include different types and/or number of hardware devices. Consequently, different assets may provide different types and quantities of computing resources.

For example, an asset may include a computing device disposed in a chassis. The computing device may include a processor, memory module, storage device, communications processor, and/or other types of hardware devices. For additional details regarding computing devices, refer to FIG. 5. The aforementioned asset may provide a combination of processing resources, memory resources, storage resources, etc. However, other assets may be adapted to only provide a single type of computing resources, e.g., storage resources, memory resources, etc., by including only a limited number and/or type of hardware devices. Additionally, any of the assets may host any number of applications and may perform any number of workloads to cooperatively provide the functionality of the deployment (100).

To enable the assets to be arranged with respect to each other, the assets of the deployment (100) may be arranged into asset collections (102). The assets may be arranged into any number of asset collections (e.g., 104, 108). Different asset collections may include different numbers and/or types of assets.

An asset collection (e.g., 104, 108) may include any number of assets arranged in a predetermined manner. For example, an asset collection may include a rack used to arrange a number of assets, having rack mountable chassis, into a predetermined arrangement (e.g., vertically stacked). The asset collections (102) may use devices other than racks to arrange the assets without departing from the invention. For additional details regarding asset collections, refer to FIGS. 2.1-2.2.

The asset collections (102) may be disposed at predetermined locations within the deployment (100). For example, the asset collections may be arranged into rows or other organizational schemes. The organization of the asset collections (102) may enable the asset collections to be cooled, provided power, etc.

Due to the number of assets (106), the number of hardware devices of each of the assets, the number of applications hosted by the assets, the workloads being performed by the assets, and the arrangement of the assets as part of assets collections (102), it may be time consuming and/or difficult to manage the assets of a deployment.

For example, consider a scenario where a deployment includes 100 asset collections implemented as racks and each of the racks includes 12 assets implemented as rack mount chassis disposed in the racks of the asset collections. In such a scenario, it may be difficult to identify any particular asset within the deployment that is hosting any particular applications.

Similarly, it may be difficult to identify which of the assets are being used to service workloads of the deployment. A workload may be one or more tasks being performed by the deployment using corresponding portions of the assets (and/or components thereof) of the deployment.

Embodiments of the invention may provide systems and methods for managing a deployment. Specifically, embodiments of the invention may provide a method for dynamically mapping the assets. The maps of the assets may include, for example, topological information, logical entities (e.g., applications such as virtual machines which, in turn, my host any number of applications) hosted by each of the assets, computing resources of the assets allocated to the logical entities of the assets, workloads being performed by the assets, management criteria for each of the logical entities (e.g., how computing resources of the assets are to be allocated when limited resources are available), and/or other types of information regarding the current state of the assets.

Additional embodiments of the invention may provide systems and methods for generating visualizations of asset maps. The visualizations may enable multidimensional information regarding the deployment to be displayed to a user in an efficient manner. Additionally, the visualizations may include interactive elements used to obtain input from the users. Such input may be obtained from natural motion interfaces. Use of multidimensional visualizations and natural user interfaces for receiving input from the users may reduce a cognitive burden on a user for understanding the current state of the deployment.

Further embodiments of the invention may provide systems and methods for automatically orchestrating management of deployments based on user input. Specifically, embodiments of the invention may provide methods for translating input received via natural motion interfaces to criteria for managing the deployment. Once input is received and translated into management criteria, the deployment may automatically update the operation of the deployment based on the management criteria. To do so, one or more components of the deployment may include deployment managers that automatically modify the operation of the one or more components based on the obtained management criteria. By doing so, the cognitive burden for actively managing a deployment may be reduced.

To provide the aforementioned functionality, a system in accordance with embodiments of the invention may include assets (e.g., 106) that identify their position, orientation, and/or other telemetry information with respect to other assets. To do so, each of the assets may include positioning sensors that may be used to identify the relative position of an asset with respect to the position of another asset. For additional details regarding assets (e.g., 106, 109), refer to FIGS. 2.1-2.2.

The position, orientation, and/or other telemetry information may be used to generate and/or maintain a map of the assets (e.g., an asset map) of the deployment (100). The map of the deployment (100) may specify, for example, the relative position of each of the assets with respect to the other assets. The map of the assets may be generated and/or maintained by an asset mapper (120).

The map of the assets of the deployment (100) may also be generated using descriptions of the arrangement of the assets of the deployment. For example, when a deployment is deployed, a description of the assets included in each of the asset collections may be generated. The aforementioned description of the assets of the deployment (100) may be used to improve the quality (e.g., accuracy, precision, etc.) of asset maps and/or determinations regarding the relative position of an observer, discussed below. For example, the description of the assets may be used to determine whether determinations regarding the location, orientation, and/or other telemetry information are likely to be accurate. In other words, whether the determinations regarding the positions and/or orientations of the assets are consistent with the description of the assets.

For example, due to the arrangement of assets as part of an asset collection, a description of the assets may specify that the assets of an asset collection should be similarly positioned with respect to a particular asset (e.g., an asset facing a rack of assets). Accordingly, if the determinations regarding the locations and/or orientations of the assets indicate that the assets of the asset collections are not located in the same relative position with respect to an asset, the determinations regarding the locations and/or orientations of the assets may be determined to be inaccurate.

The map of the assets of the deployment (100) may include additional information (e.g., in addition to topology information) regarding each of the assets such as, for example, applications hosted by the assets, workloads being performed by the assets, associations between the assets and organizations (e.g., users of a portion of the assets in multitenant environments), deployment management information (e.g., computing resource priorities for the applications/workloads hosted by the assets), etc. Such information may be used, in part, to provide enhanced asset maps. The information may be obtained from any number of sources including, for example, operating systems or other management entities hosted by the assets and/or deployment data sources (140) separate from the assets.

To manage the deployment, the system may include one or more clients (e.g., 130). A client (130) may be a device (physical or virtual) operated by a person (e.g., an administrator, a technician, etc.) tasked with managing the deployment (100). The client (130) may provide visualizations of the multidimensional information included in asset maps of the deployment, enable input regarding the visualizations to be obtained via natural motion interfaces, translate the input to deployment management criteria, and enforce the deployment management criteria on the deployment (e.g., send commands to the assets to modify their operations, send copies of the deployment management criteria to the assets and allow services hosted by the assets to enforce the criteria, etc.). For additional details regarding the client (130), refer to FIG. 2.4.

While illustrated as including a single client (130) in FIG. 1, a system in accordance with embodiments of the invention may include any number of clients. For example, a first client may be utilized by a person that is near the deployment (100) and a second client may be utilized by a second person that is remote to the deployment (100). By doing so, visualizations may be shared concurrently to multiple persons enabling managing of the deployment to be distributed across any number of persons.

The components of the system of FIG. 1 may be operably connected to each other and/or other entities via any combination of wired and/or wireless network. For example, the aforementioned components may each be operably connected to a network (110) that facilitates communications between these components.

The deployment (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment (100) described in this application and/or all, or a portion, of the methods illustrated in FIG. 3. The deployment (100) may be implemented using other types of computing devices without departing from the invention. For additional details regarding computing devices, refer to FIG. 5.

The deployment (100) may be implemented using logical devices without departing from the invention. For example, the deployment (100) may be implemented using virtual machines that utilize computing resources of any number of physical computing devices (e.g., refer to FIG. 5) to provide their respective functionalities. The deployment (100) may be implemented using other types of logical devices without departing from the invention.

In one or more embodiments of the invention, the deployment (100) provides any number of computer implemented services. The computer implemented services may include, for example, file storage services, database services, electronic communication services, etc. The deployment (100) may provide other types of computer implemented services without departing from the invention. Each of the assets (e.g., 106, 109) of the deployment (100) may provide similar and/or different computer implemented services.

The asset mapper (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset mapper (120) described in this application and/or all, or a portion, of the methods illustrated in FIG. 3. The asset mapper (120) may be implemented using other types of computing devices without departing from the invention. For additional details regarding computing devices, refer to FIG. 5.

The asset mapper (120) may be implemented using logical devices without departing from the invention. For example, the asset mapper (120) may be implemented using virtual machines that utilize computing resources of any number of physical computing devices (e.g., refer to FIG. 5) to provide their respective functionalities. The asset mapper (120) may be implemented using other types of logical devices without departing from the invention.

In one or more embodiments of the invention, the asset mapper (120) maintains assets maps of the deployment. To do so, the asset mapper (120) may obtain information regarding the deployment from the assets of the deployment and/or deployment data sources (140). The asset mapper (120) may generate assets maps based on the obtained information and provide copies of the maps to other entities such as, for example, the client (130). For additional details regarding the asset mapper (120), refer to FIG. 2.3.

While illustrated as a separate entity, the functionality of the asset mapper (120) may be implemented via the client (130) and/or the assets (106, 109) of the deployment (100). For example, the asset mapper (120) may be implemented as a distributed application that executes using the computing resources of the other components of the system of FIG. 1 and/or computing resources of other entities not illustrated in FIG. 1.

In one or more embodiments of the invention, the asset mapper (120) provides mapping services. Mapping services may include generating of asset maps of deployments and/or client oriented asset maps and/or providing asset maps and/or client oriented asset maps. To generate such maps, the asset mapper (120) may obtain location information (e.g., relative position, orientation, and/or other telemetry information) regarding one or more of the assets (106, 109) and/or the client (130) with respect to each other. The aforementioned information may be utilized to generate the asset maps and/or client oriented asset maps.

The client (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (130) described in this application and/or all, or a portion, of the methods illustrated in FIG. 3. The client (130) may be implemented using other types of computing devices without departing from the invention. For additional details regarding computing devices, refer to FIG. 5.

The client (130) may be implemented using logical devices without departing from the invention. For example, the client (130) may be implemented using virtual machines that utilize computing resources of any number of physical computing devices (e.g., refer to FIG. 6) to provide their respective functionalities. The client (130) may be implemented using other types of logical devices without departing from the invention.

In one or more embodiments of the invention, the client (130) deployment management services. The deployment management services may include (i) generating visualizations of multidimensional information regarding the deployment, (ii) obtaining input from users of the client, (iii) translating the input to deployment management criteria, and (iv) enforcing the deployment management criteria on the deployment resulting in an updated operation of the deployment. For additional details regarding the client, refer to FIG. 2.4.

The deployment data sources (140) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment data sources (140) described in this application and/or all, or a portion, of the methods illustrated in FIG. 3. The deployment data sources (140) may be implemented using other types of computing devices without departing from the invention. For additional details regarding computing devices, refer to FIG. 5.

The deployment data sources (140) may be implemented using logical devices without departing from the invention. For example, the deployment data sources (140) may be implemented using virtual machines that utilize computing resources of any number of physical computing devices (e.g., refer to FIG. 5) to provide their respective functionalities. The deployment data sources (140) may be implemented using other types of logical devices without departing from the invention.

In one or more embodiments of the invention, the deployment data sources (140) provide any type and quantity of information (e.g., characteristics) regarding the deployment. For example, the deployment data sources (140) may provide information (e.g., characteristics) regarding the applications hosted be any of the assets, workloads being performed by any of the assets, associations between the assets and organizations (e.g., if more than one organization is utilizing assets of the deployment), interconnections between the assets and/or other devices (e.g., network connectivity), and/or any other types of information regarding the deployment.

The deployment data sources (140) may include functionality to respond to queries regarding characteristics of assets of the deployment. For example, the deployment data sources (140) may maintain the information regarding the deployment in a database that enables the information to be searched for relevant information. The deployment data sources (140) may provide the relevant information in response to queries regarding characteristics of the assets of the deployment.

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, the assets of the deployment of FIG. 1 may be arranged into asset collections. FIG. 2.1 shows a diagram of an example asset collection (200) in accordance with one or more embodiments of the invention. As discussed above, an asset collection may be a physical arrangement of assets (e.g., 202).

To arrange the assets (e.g., 202) of the example asset collection (200) with respect to each other, the example asset collection (200) may include a structural element such as, for example, a frame (210). A frame (210) may be a physical structure adapted to position and/or orient multiple assets within a predetermined space. For example, the frame (210)

maybe implemented as a rack mount structure adapted to receive the chassis of the assets. When the assets are received by the frame (210), the assets (e.g., 202) may be reversibly locked in place with respect to each other.

For example, as illustrated in FIG. 2.1, the frame (210) may enable the assets (e.g., 202) to be vertically stacked with respect to the other assets (202). By doing so, the assets (e.g., 202) may be packed tightly with respect to each other and/or positioned and/or oriented in a predetermined with respect to each other. For example, as seen in FIG. 2.1, the assets may be stacked with respect to each other and orient a predetermined face of each asset.

The oriented predetermined face of each asset may include, for example, on or more positioning sensors (204). The positioning sensors (204) of the assets (e.g., 202) may enable the assets to ascertain the position, orientation, and/or other telemetry information with respect to each other.

In one or more embodiments of the invention, the positioning sensors are implemented as photonic sensors. A photonic sensor may be a device that utilizes electromagnetic radiation in an optical or near optical band to ascertain information regarding the environment in which the photonic sensor resides.

For example, a photonic sensor may include optical resonators, optical transceivers, data processors, and/or other types of hardware devices that are able to sense the position, orientation, and/or other telemetry information regarding other photonic sensors in the vicinity of the photonic sensor. By operating in an optical or near optical frequency band, the photonic sensor may obtain telemetry information without utilizing electromagnetic radiation in a frequency band used by the system of FIG. 1 for communication purposes. For example, the system of FIG. 1 may utilize one or more wireless network that operates between 1 Megahertz and 100 Gigahertz. In contrast, the photonic sensors may operate utilizing electromagnetic radiation having a frequency content above 300 Gigahertz. Consequently, the photonic sensors may be utilized to provide telemetry information without receiving interference due to communication by the system of FIG. 1. Similarly, the photonic sensors may operate without cause interference with communications by the system of FIG. 1.

The positioning sensors (204) may be implemented as different types of sensors without departing from the invention. For example, the positioning sensors (204) may be implemented using sensors that operate in the microwave frequency band such as, for example, distance and/or orientation finding sensors.

The positioning sensors (204) of each of the assets (202) may be operably coupled to computing resources of the respective assets. For additional details regarding the computing resources of the respective assets and utilization of the sensor data provided by the positioning sensors (204), refer to FIG. 2.2.

While the example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.1 without departing from the invention.

As discussed above, an asset may include computing resources. The computing resources may be used to host logical entities (e.g., programs, virtual entities). FIG. 2.2 shows a diagram of an asset (202) in accordance with one or more embodiments of the invention. The assets (106, 109) of FIG. 1 may be similar to the asset illustrated in FIG. 2.2.

As discussed above, an asset may provide computer implemented services as part of the deployment (100). To do so, the operation of the asset (202) may need to be managed. To facilitate management of the asset (202), the asset may provide information (e.g., topology, hosted logical entities, etc.) regarding itself to an asset mapper or another entity. Additionally, the asset may enforce deployment management criteria on itself to ensure that the asset (202) operates in a manner compatible with the desired functionality of the deployment. To provide the aforementioned functionality, the asset (202) may include a deployment manager (232) and storage (240). Each of these components of the asset (202) is discussed below.

The deployment manager (232) may be implemented using physical and/or logical devices. For example, the deployment manager (232) may be implemented using computer readable instructions (e.g., program code) that when executed by the computing resources of the asset (202) give rise to the functionality of the deployment manager (232). In another example, the deployment manager (232) may be implemented using special purpose hardware devices such as, for example, programmable gate arrays, application specific integrated circuit, or another type of hardware device that provides the functionality of the deployment manager (232) by including circuitry adapted to provide the aforementioned functionality. In a still further example, the deployment manager (232) may be implemented using a combination of computer readable instructions (e.g., program code) and special purpose hardware devices.

The deployment manager (232) may manage the operation of the asset (202). To manage the operation of the asset (202), the deployment manager (232) may (i) maintain an asset description (242) that includes information regarding the asset, (ii) provide information included in the asset description (242) to other entities, and (iii) enforce a deployment description (242) on the asset (202) and/or enforce operation modification requests obtained from a client. When providing the above noted functionality, the asset (202) may cooperate with other entities of the system of FIG. 1 to provide, for example, the functionality of the deployment, the asset mapper, and/or the client.

Figure 3:
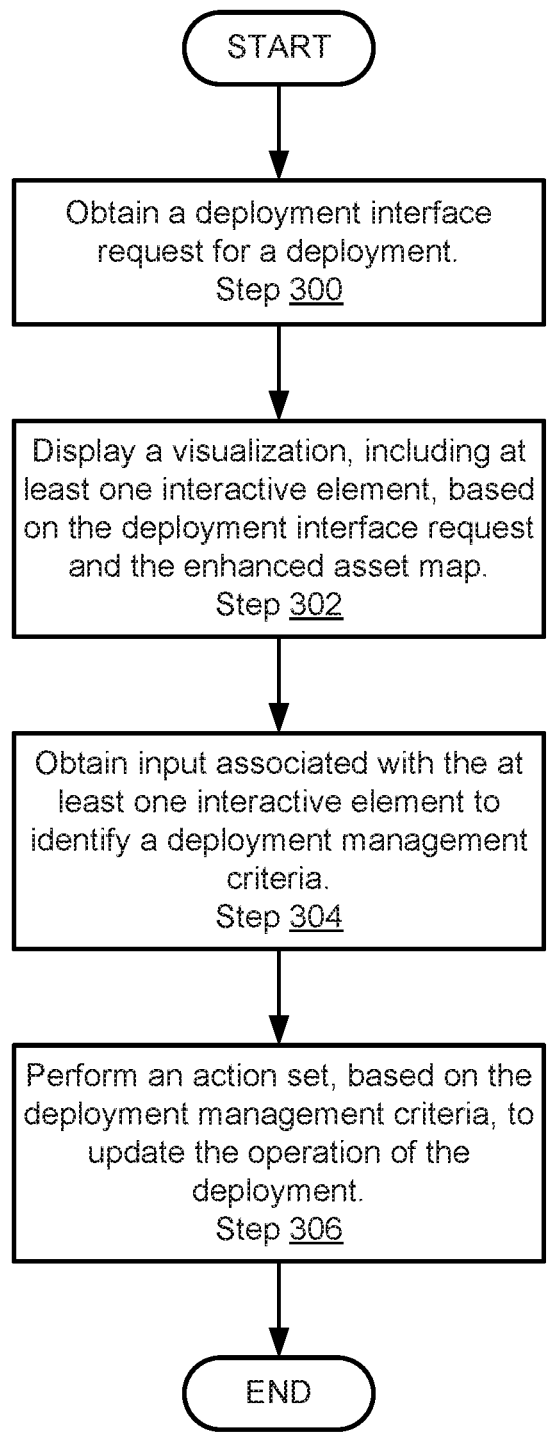
FIG. 3 shows a flowchart of a method of managing a deployment in accordance with one or more embodiments of the invention.

When providing the above noted functionality, the deployment manager (232) may perform all, or a portion, of the method illustrated in FIG. 3.

In one or more embodiments of the invention, the storage (240) includes devices that provide data storage services (e.g., storing data and providing copies of previously stored data). The devices that provide data storage services may include hardware devices and/or logical devices. For example, the storage (240) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (240) may include a memory device (e.g., a dual in line memory device) in which data is stored and from which copies of previously stored data are provided. In another example, the storage (240) may include a persistent storage device (e.g., a solid state disk drive) in which data is stored and from which copies of previously stored data is provided. In a still further example, the storage (240) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (240) may store data structures including an asset description (242) and a deployment description (244). Each of these data structures is discussed below.

The asset description (242) may be a data structure that includes information regarding the hardware components of the asset, logical entities (e.g., applications not shown in FIG. 2.2) hosted by the asset, information regarding the environment in which the asset resides (e.g., network connectivity information, neighboring devices identified using proximity sensors, identifiers of frames or other structures in which the asset (202) is housed, etc.), and/or other aspects of the asset (202) such as workloads being performed by the asset (202), associations between the asset (202) and an organization, etc. The deployment manager (232) may maintain the asset description (242) as aspects of the asset (202) change due to, for example, hardware, software, and/or changes in the environment proximate to the asset (202). For example, the deployment manager (232) may modify the contents of the asset description (242) so that the asset description (242) includes up to date information regarding the asset (202).

The deployment description (242) may be a data structure that specifies how the asset (202) operates. For example, the deployment description (242) may specify the allocations of computing resources of the asset to logical entities/workloads hosted by the asset, configuration settings of hardware components of the asset, configuration settings of the logical entities/workloads hosted by the asset, etc. The deployment description (242) may be maintained by the deployment manager (232). When deployment management criteria is obtained from a client or another entity, the deployment manager (232) may modify the deployment description (242) to match or reflect the obtained information.

While the storage (240) has been illustrated as including data structures that include a limited amount of specific information, any of the data structures stored in the storage (240) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset (202) is illustrated in FIG. 2.2 as including a limited number of specific components, an asset in accordance with embodiments of the invention may include additional, fewer, and/or different components from those illustrated in FIG. 2.2 and/or discussed above without departing from the invention.

As discussed above, the asset mapper (120) of FIG. 1 may generate, maintain, and/or provide asset maps and/or enhanced asset maps. FIG. 2.3 shows a diagram of the asset mapper (120) in accordance with one or more embodiments of the invention.

The asset mapper (120) may provide mapping services for deployments. Mapping services may include maintaining asset maps and/or enhanced asset maps and/or providing the aforementioned maps to other entities. To provide the aforementioned functionality, the asset mapper (120) may include a deployment manager (232) and storage (240). Each of these components of the asset mapper (120) is discussed below.

The deployment manager (232) may be implemented using physical and/or logical devices. For example, the deployment manager (232) may be implemented using computer readable instructions (e.g., program code) that when executed by the computing resources of the deployment manager (232) give rise to the functionality of the deployment manager (232). In another example, the deployment manager (232) may be implemented using special purpose hardware devices such as, for example, programmable gate arrays, application specific integrated circuit, or another type of hardware device that provides the functionality of the deployment manager (232) by including circuitry adapted to provide the aforementioned functionality. In a still further example, the deployment manager (232) may be implemented using a combination of computer readable instructions (e.g., program code) and special purpose hardware devices.

The deployment manager (232) may provide the mapping services of the asset mapper (120). Mapping services may include generating asset maps (264) and/or enhanced asset maps (266) using information obtained from assets (e.g., the positions and/or orientation of the assets with respect to each other) of a deployment, deployment information sources, and/or other sources of information and (ii) providing the maps to other entities. Enhanced and unenhanced asset maps may be utilized by the client or other entities to generate visualizations of multidimensional information regarding the deployment. The maps may be utilized for other purposes without departing from the invention.

When providing the above noted functionality, the deployment manager (232) may perform all, or a portion, of the methods illustrated in FIG. 3. The deployment manager (232) of the asset mapper (120) and the assets (e.g., FIG. 2.3) may form a distributed service that facilitates management of the deployment. Each of the instances of the deployment manager (232) may provide different functionality depending on where it is instantiated. Similar instances of the deployment manager (232) may be present on the client as will be discussed with respect to FIG. 2.4.

In one or more embodiments of the invention, the storage (260) includes devices that provide data storage services (e.g., storing data and providing copies of previously stored data). The devices that provide data storage services may include hardware devices and/or logical devices. For example, the storage (260) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (260) may include a memory device (e.g., a dual in line memory device) in which data is stored and from which copies of previously stored data are provided. In another example, the storage (260) may include a persistent storage device (e.g., a solid state disk drive) in which data is stored and from which copies of previously stored data is provided. In a still further example, the storage (260) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (260) may store data structures including asset descriptions (262), asset maps (264), and enhanced asset maps (266). Each of these data structures is discussed below.

The asset descriptions (262) may be a data structure that includes information regarding the assets of the deployment. For example, asset descriptions (262) may specify the assets that are included in each of the asset collections. In other words, the assets that are included in each of the racks or other organizational structures/asset enclosures of the deployment. The asset descriptions (262) may include additional (e.g., enhanced maps), different, and/or less information regarding the assets of the deployments without departing from the invention.

The asset descriptions (262) may be implemented as, for example, a table where each row is associated with an asset collection and the columns of the row include identifiers of assets that are disposed in the asset collection associated with the row. The asset descriptions (262) may be maintained, at least in part, by, for example, an administrator, technician, and/or other persons. The asset descriptions (262) may be maintained, at least in part, by, for example, the assets and the deployment manager (232). For example, the assets may identify other assets operably connected to each other by a networking device of an asset enclosure. Based on the identification, the assets may determine that each of the connected assets is likely to be part of a similar asset collection. The assets may provide such information to the deployment manager (232) which, in turn, may update the asset descriptions (262) based on the information obtained from the assets.

The assets may provide other types of information to the deployment manager (232) regarding the likely member of the assets with respect to asset collections without departing from the invention. For example, the assets may utilize sensors to identify other assets that are in close proximity to other assets. Based on the identification, the assets may determine that, due to proximity, the assets are members of asset collections.

The asset maps (264) may be a data structure that includes asset maps of assets of deployments. The asset maps (264) may specify, for example, the topology of each asset of the deployment. The asset maps (264) may specify any amount of such information without departing from the invention.

The client oriented asset maps (266) may be a data structure that includes the information included in the asset maps (264) and enhanced with additional information in addition to the topology information included in the asset maps. For example, the enhanced asset maps (266) may include the logical entities hosted by each of the assets, and/or other types of information that may be included in a description of an asset as described with respect to FIG. 2.2 and/or information obtained from any number of deployment data sources.

While the storage (260) has been illustrated as including data structures including a limited amount of specific information, any of the data structures stored in the storage (260) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset mapper (120) is illustrated in FIG. 2.3 as including a limited number of specific components, an asset mapper in accordance with embodiments of the invention may include additional, fewer, and/or different components from those illustrated in FIG. 2.3 and/or discussed above without departing from the invention.

As discussed above, the client (130) of FIG. 1 may facilitate management of a deployment. FIG. 2.4 shows a diagram of the client (130) in accordance with one or more embodiments of the invention.

As discussed above, the client (130) may provide deployment management services. To provide the aforementioned functionality, the client (130) may include a deployment manager (232), natural motion interface (270), and storage (280). Each of these components of the client (130) is discussed below.

The deployment manager (232) may provide deployment management services. The services may include (i) generating/displaying visualizations based on enhanced asset maps (266), (ii) obtaining input regarding the visualizations via the natural motion interface (270), (iii) translating the obtained input into deployment management criteria, and/or (iv) enforcing the deployment management criteria on the deployment. To enforce the deployment management criteria on the deployment, the deployment manager (232) may send commands to the assets of the deployment or update the deployment description to reflect the deployment management criteria.

When providing the above noted functionality, the deployment manager (232) may perform all, or a portion, of the methods illustrated in FIG. 3. As noted above, the deployment manager (232) may be part of a distribute services that facilitates management of the deployment.

The deployment manager (232) may be implemented using physical and/or logical devices. For example, the deployment manager (232) may be implemented using computer readable instructions (e.g., program code) that when executed by the computing resources of the deployment manager (232) give rise to the functionality of the deployment manager (232). In another example, the deployment manager (232) may be implemented using special purpose hardware devices such as, for example, programmable gate arrays, application specific integrated circuit, or another type of hardware device that provides the functionality of the deployment manager (232) by including circuitry adapted to provide the aforementioned functionality. In a still further example, the deployment manager (232) may be implemented using a combination of computer readable instructions (e.g., program code) and special purpose hardware devices.

The natural motion interface (270) may facilitate obtaining of user input. For example, the natural motion interface (270) may (i) obtain information from an input device such as, for example, a touch screen, a pointing device, an augmented reality interface, or any other type of input device and (ii) translate the obtained information into deployment management criteria. The deployment management criteria may be information reflecting interactive portions of a visualization displayed to a user such as, for example, a box that when interacted with by a pointing device is considered a selection of the box. The natural motion interface (270) may translate any type and quantity of information obtained from one or more input devices into any quantity of deployment management criteria. The deployment management criteria may include, for example, changes to the operation of the deployment.

When providing the above noted functionality, the natural motion interface (270) may perform all, or a portion, of the methods illustrated in FIG. 3.

The natural motion interface (270) may be implemented using physical and/or logical devices. For example, the natural motion interface (270) may be implemented using computer readable instructions (e.g., program code) that when executed by the computing resources of the natural motion interface (270) give rise to the functionality of the natural motion interface (270). In another example, the natural motion interface (270) may be implemented using special purpose hardware devices such as, for example, programmable gate arrays, application specific integrated circuit, or another type of hardware device that provides the functionality of the natural motion interface (270) by including circuitry adapted to provide the aforementioned functionality. In a still further example, the natural motion interface (270) may be implemented using a combination of computer readable instructions (e.g., program code) and special purpose hardware devices.

In one or more embodiments of the invention, the storage (280) includes devices that provide data storage services (e.g., storing data and providing copies of previously stored data). The devices that provide data storage services may include hardware devices and/or logical devices. For example, the storage (280) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (280) may include a memory device (e.g., a dual in line memory device) in which data is stored and from which copies of previously stored data are provided. In another example, the storage (280) may include a persistent storage device (e.g., a solid state disk drive) in which data is stored and from which copies of previously stored data is provided. In a still further example, the storage (280) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (280) may store data structures including enhanced asset maps (266) and a copy of the deployment description (242). Each of these data structures is discussed below.

The enhanced asset maps (266) may be similar to the enhanced asset maps (266) as described with respect to FIG. 2.3. The deployment manager (232) may ensure that the copy of the enhanced asset maps (266) included in the storage of the client mirrors that of the copy included in the asset mapper.

The deployment description (242) may be similar to the deployment description (242) hosted by the assets. However, the deployment description (242) may be considered the primary copy of the deployment description (242). Other copies of the deployment description (242) hosted by the assets may be maintained to mirror the copy hosted by the client (130). By doing so, changes to the deployment description (242) hosted by the client (130) may be propagated to the assets.

While the storage (280) has been illustrated as including data structures that include a limited amount of specific information, any of the data structures stored in the storage (280) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the client (130) is illustrated in FIG. 2.4 as including a limited number of specific components, a client in accordance with embodiments of the invention may include additional, fewer, and/or different components from those illustrated in FIG. 2.4 and/or discussed above without departing from the invention.

As discussed above, the system of FIG. 1 may provide deployment management services. FIG. 3 shows a method that may be performed by components of the system of FIG. 1 to provide deployment management services.

FIG. 3 shows a flowchart of a method in accordance with one or more embodiments of the invention. The method depicted in FIG. 3 may be used to manage a deployment in accordance with one or more embodiments of the invention. The method shown in FIG. 3 may be performed by, for example, a deployment manager (e.g., 232, FIGS. 2.2-2.4). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a deployment interface request for a deployment is obtained. The interface request may request that management of the deployment be initiated. In other words, that information be provided that may enable the deployment be managed.

The deployment interface request may be obtained from, for example, a user of a client by selection of an interface button of the client or from another computing device via an operable connection.

In step 302, a visualization, including at least one interactive element, based on the deployment interface request and an enhanced asset map associated with the deployment is displayed. The visualization may be generated dynamically in response to the deployment interface request.

The visualization may illustrate the dimension of data regarding the deployment that are available for display. For example, the visualization may include an operations panel (e.g., a first viewable area) specifying the different dimensions available for display, options for illustration of the dimensions, and/or other features related to managing display of the information included in the enhanced asset map. The visualization may also include a display panel (e.g., a second viewable area) that illustrates the information a user selects via the operations panel for display.

In one or more embodiments of the invention, the visualization is displayed on a touch sensitive display. The touch sensitive display may enable a person to provide tactile feedback to select portions of the operations panel. Similarly, the touch sensitive display may enable a person to provide tactile feedback to select/interact with portions of the display panel. When a display is generated, interaction with graphical elements of the display via gestures along the touch sensitive display may be considered modifications of the displayed dimensions of information. For example, the graphical elements may be considered to be slider bars that enable a user to interact with the graphical elements to change their respective values.

The visualizations may be displayed via other methods and input may be obtained via other methods without departing from the invention. For example, the visualizations may be displayed on a non-touch sensitive display and a pointing device may be used to obtain user input. Similarly, the visualizations may be displayed via an artificial reality headset (e.g., goggles) and a floating pointing device, bodysuit, wand, joystick, or other type of input device may be utilized to obtain user input.

In step 304, input associated with the at least one interactive element is obtained to identify a deployment management criteria. The input may be obtained via the input device discussed with respect to step 302. The input may be translated via a natural motion interface to a deployment management criteria. In other words, the motion and/or other type of input provided by the user input device may be translated into actionable criteria for modifying the operation of the deployment.

For example, the input obtained via the user input device may be correlated with the locations of the visualization associated with a cursor or other graphical display of the user input with respect to the at least one interactive element. The combination of the input and the interaction with the at least one interactive element may indicate the specific deployment management criteria implicated by the input.

In step 306, an action set, based on the deployment management criteria, is performed to update the operation of the deployment.

In one or more embodiments of the invention, the action set includes updating a deployment description based on the deployment management criteria. For example, the deployment management criteria may be modified to reflect the deployment management criteria.

The assets may update their copies of the deployment description and enforce the deployment description on the respective assets.

In one or more embodiments of the invention, the action set includes enforcing the deployment management criteria on the assets. Enforcing the deployment management criteria may include sending commands to the assets to modify their operation based on the deployment management criteria.

The deployment management criteria may reflect a change in any dimension of an enhanced asset map associated with the deployment. The change may be, for example, allocating computational resources of the asset to an application hosted by the asset. The change may be, for example, a modification of a description of an asset (e.g., termination of an application/workload, instantiation of an application/workload, etc.).

The method may end following step 306.

Using the method illustrated in FIG. 3, a system in accordance with embodiments of the invention may provide information that enables deployments to be efficiently and facilitates modification of the operation of the deployments by using modification of the visualizations as instructions for modifying the deployment. By doing so, a unified interface for both visualizing operation of the deployment and modifying operation of the deployment may be provided. Consequently, the cognitive burden on users of the system may be greatly reduced when compared to other methods of managing deployments.

To further clarify embodiments of the invention, a non-limiting example is provided in FIGS. 4.1-4.10. FIG. 4.1 shows a system similar to that illustrated in FIG. 1. FIGS. 4.2-4.10 illustrate visualizations of the deployment presented to a user and input provided by the user. For the sake of brevity, only a limited number of components of the system of FIG. 1 are illustrated in each of FIGS. 4.1-4.10.

EXAMPLE

Consider a scenario as illustrated in FIG. 4.1 in which a deployment includes three racks (400, 410, 420) of computing units (402, 404, 412, 414, 422). An administrator tasked with managing the deployment receives complaints that a database application hosted by the first compute unit (402) is performing poorly.

The administrator is not locally present with respect to the deployment but does have a client (not shown) that may be used to manage the deployment. To manage the deployment, the administrator issues a deployment interface request for the first compute unit (402) by initiating the deployment manager hosted by the client and selecting an icon corresponding to the first compute unit (402).

In response to the deployment interface request, the deployment manager generates a visualization as illustrated in FIG. 4.2 and displays it on a display of the client. In this instance, the client is operably connected to a touch sensitive display which enables user input to be readily captured. In FIGS. 4.2-4.10, visualizations generated by the deployment manager are illustrated. In the illustrations, a hand of the administrator is illustrated with an out stretched pointer finger. In the following figures, dashed lines extend from the pointer finger to indicate paths along which the finger of the administrator traversed the touch sensitive display. Large X indicators are added to the drawings where the administrator provided additional user input in the form of, for example, higher pressure on the display. The natural motion interface of the client uses the aforementioned paths and additional user input to identify how the user desires the visualization to depict information regarding the deployment and obtain deployment management criteria.

As seen in FIG. 4.2, the visualization includes a workloads rendering (430) portion which includes representations of workloads being performed by the first compute unit. In FIG. 4.2, the workloads rendering (430) includes a database application (432) representation in the form of a rectangular portion of the visualization and an email server application (434) representation in the form of a second rectangular portion. The administrator interacts with the database application (432) representation which the deployment manager interprets as a desire of the user to be provided with additional information regarding the database application.

In response, the deployment manager modifies the visualization, as seen in FIG. 4.3, to include more information regarding the database application in the operations panel of the visualization. Specifically, the database application (432) representation has been expanded in size to encompass the entire operations panel of the visualization and three additional representations have been added to the database application (432) representation. The additional representations include a settings (446) representation, a new settings (448) representation, and a renderings settings (450) representation.

The settings (446) representation includes information regarding the current operation settings associated with the database application. Specifically, 3 gigabytes of memory and 100 gigabytes of storage of the first compute unit have been allocated for use by the database application. The settings (446) representation also indicates that the database application (432) is given a priority of 1. In other words, that the database application (432) is given high priority for computing resources when the first compute unit may not have sufficient computing resources to allocate to all of the workloads hosted by the first compute unit.

The new settings (448) representation includes similar information to the settings (446) representations because new settings for the allocation of computing resources/priority have not yet been provided.

The rendering settings (450) representation includes information regarding the operations for generating renderings to be displayed in the display panel (not shown, will be shown to the right of the operations panel in later figures).

The administrator decides that it may be helpful to modify the amount of memory allocated to the database application (432) and provides user input as seen in FIG. 4.4. As seen in FIG. 4.4, the administrator first interacts with the 3 gigabytes of memory portion of the settings (446) representation and then interacts with the X axis portion of the rendering settings (450) representation.

In response, the deployment manager generates a two dimensional plot in the display panel. The two dimensional plot includes a graphical element in the form of a rectangular box marked as DB to indicate the database application. The box is placed at 3 gigabytes along the X axis of the two dimensional plot.

The administrator next interacts with the 3 gigabytes of memory portion of the new settings (448) representation and then interacts with the Y axis portion of the rendering settings (450) representation, as seen in FIG. 4.5.

In response, the deployment manager updates the two dimensional plot to indicate that the graphical representation is located at 3 gigabytes along the Y axis of the two dimensional plot.

The administrator next interacts graphical representation of the database in the two dimensional plot by first interacting with it as indicated by the first X and then continues to interact with the display while moving the point of contact to the second X, as seen in FIG. 4.6. While doing so, the two dimensional plot is updated by sliding the graphical representation of the database application along with the finger from the first location marked by the X to the second location marked by the X. The motion is further indicated by the arrow between the two boxes at each location. As seen from FIG. 4.6, the graphical representation is moved along the Y axis up to 6 gigabytes which is automatically translated into a change in the new settings (448) representation to 6 gigabytes.

While not graphically illustrated here, the deployment manager interprets this change in the new settings (448) representation as a deployment management criteria. In response, the deployment manager updates the deployment description to indicate that 6 gigabytes of memory of the first compute unit are to be allocated to the database application.

After the first compute unit updates its copy of the deployment description to match chat maintained by the client, the first compute units increases the allocation of memory for the database application to 6 gigabytes thereby enforcing the deployment description on the deployment.

The administrator next resets the visualization as illustrated in FIG. 4.7 to the visualization illustrated in FIG. 4.2 by selecting a series of back buttons not illustrated in FIGS. 4.2-4.6 for brevity. After resetting the visualization, the administrator interacts with the workload rendering (430) representation by circling both the database application (432) representation and the email server application (434) representation while interacting with the touch sensitive display as indicated by the circular dashed path surrounding both representations and beginning and terminating in the location marked with an X.

In response, the deployment manager modifies the visualization, as seen in FIG. 4.8, to include more information regarding both applications in the operations panel of the visualization. Specifically, a common settings (460) representation is added to the visualization including a setting (462) representation and a rendering settings (450) representation. The settings (462) representation includes setting that are available for both applications includes memory, storage, and priority.

The administrator decides that it may be helpful to review the priority that is set for each of the applications. As seen in FIG. 4.9, the administrator first interacts with the priority portion of the settings (462) representation and then interacts with the Y axis portion of the rendering settings (450) representation.

In response, the deployment manager generates a two dimensional plot that includes a first graphical representation of the database application and a second graphical representation of the email server application. The first graphical representation has a square shape and the second graphical representation has a triangular shape. Both include corresponding initials to further distinguish the representations.

The graphical representations are separately disposed at different locations along the X axis of the plot and both are aligned with a priority of 1 on the Y axis. Based on the plot, the administrator determines that the email server application is being given the same priority as the database application for purposes of computing resource allocation when insufficient computing resources are available for allocation. The administrator concludes that to improve the performance of the database application, the priority of the email server application should be reduced.

To do so, the administrator interacts with the graphical representation of the email servicer application in the two dimensional plot by first interacting with it as indicated by the first X and then continues to interact with the display while moving the point of contact to the second X, as seen in FIG. 4.10. While doing so, the two dimensional plot is updated by sliding the graphical representation of the email server application along with the finger from the first location marked by the X to the second location marked by the X. As seen from FIG. 4.10, the graphical representation is moved along the Y axis up to a priority of 2 which is automatically translated into a change in the priority of the email server application to 2.

While not graphically illustrated here, the deployment manager interprets this change in priority as a deployment management criteria. In response, the deployment manager updates the deployment description to indicate that the email server application the first compute unit is to be afforded a priority of 2.

After the first compute unit updates its copy of the deployment description to match that maintained by the client, the first compute units increases the priority of the email server application to 2 thereby enforcing the deployment description on the deployment. After this change, computing resources are preferentially allocated to the database application over the email server application resulting in an improvement in the operation of the performance of the database application.

END OF EXAMPLE

Thus, as illustrated in FIGS. 4.1-4.10, embodiments of the invention may provide a method for enabling deployment to be efficiently managed. For example, by displaying multi-dimensional visualizations of the operation of the assets of the deployment in an interactive manner, the cognitive burden on administrator or other personnel for managing the deployment may be reduced.

Figure 5:
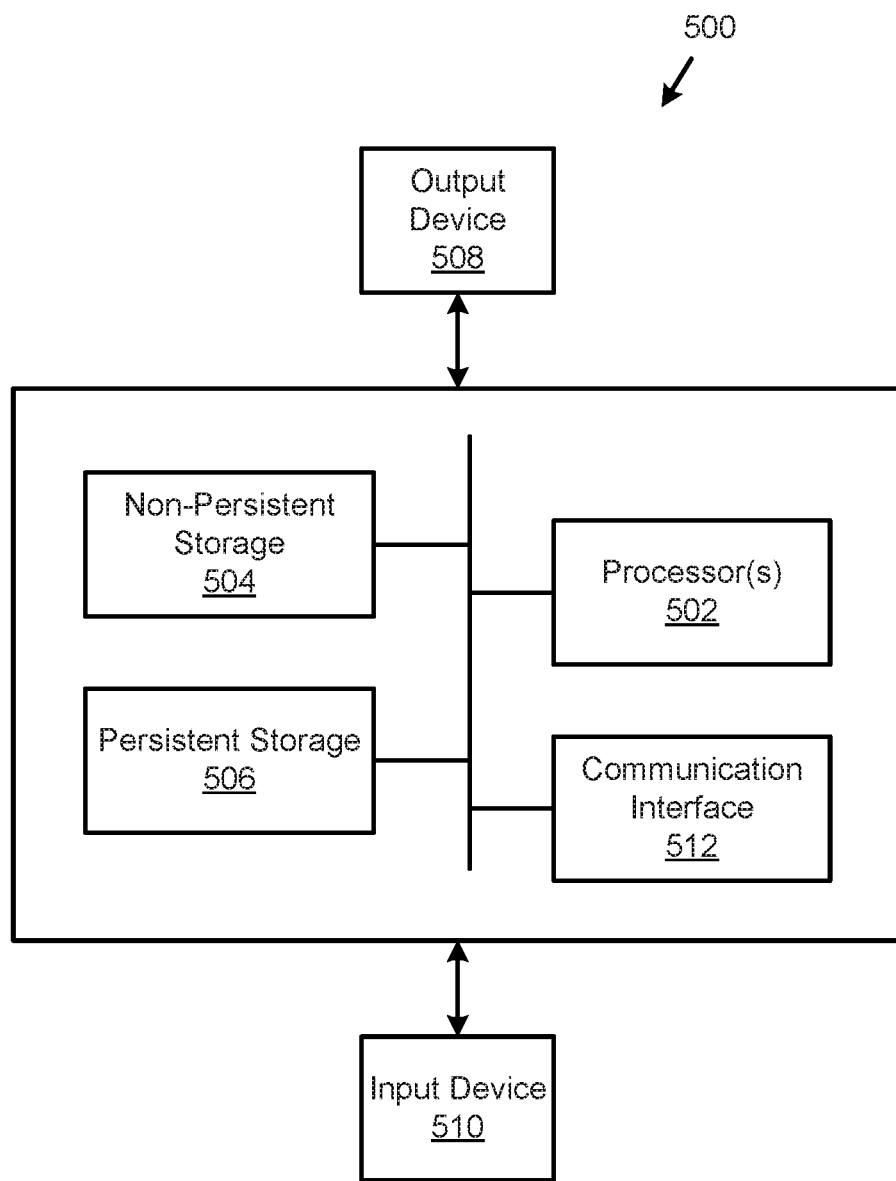
FIG. 5 shows a diagram of a computing device in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide methods and system for managing deployments that reduce the cognitive burden on administrators of the deployment. To do so, embodiments of the invention may provide a system that generates enhanced asset maps of the deployments. Multi-dimensional, interactive visualizations of the enhanced asset maps may be displayed to administrators. By utilizing user input obtained directly from the visualizations, the likelihood of errors in management of the deployment may be reduced.

Thus, embodiments of the invention may reduce the cognitive burden on a user thereby improving the usability and/or serviceability of a deployment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A system for managing a deployment, comprising:
   storage for storing an enhanced asset map of the deployment; and
   a deployment manager programmed to:
   obtain a deployment interface request for the deployment;
   in response to obtaining the deployment interface request:
   generate a visualization using the enhanced asset map of the deployment and the deployment interface request, wherein generating the visualization comprises:
   identifying a dimension of the enhanced asset map of the deployment;
   associating the dimension with an axes of a plot; and
   populating the plot with at least one interactive element;
   display the visualization comprising the at least one interactive element;
   obtain input via the at least one interactive element using a natural motion interface, wherein obtaining the input comprises:
   identifying a gesture using the at least one interactive element by tracking movement of an input device associated with the natural motion interface; and
   translating the gesture to a modification of the deployment; and
   perform an action set, based on the input, to update an operation of the deployment.

2. The system of claim 1, wherein performing the action set comprises:
   modifying a deployment description based on the input to obtain an updated deployment description; and
   enforcing the updated deployment description on at least one asset of the deployment.

3. The system of claim 2, wherein enforcing the updated deployment description on the at least one asset of the deployment comprising allocating computational resources of the asset to an application hosted by asset.

4. The system of claim 1, wherein performing the action set comprises:
   instructing an asset to perform an action based on the modification of the deployment.

5. The system of claim 1, wherein performing the action set comprises:

modifying a deployment description associated with the deployment based on the modification of the deployment.

6. A method for managing a deployment, comprising:
obtaining a deployment interface request for the deployment;
in response to obtaining the deployment interface request:
generating a visualization using the enhanced asset map of the deployment and the deployment interface request, wherein generating the visualization comprises:
identifying a dimension of the enhanced asset map of the deployment;
associating the dimension with an axes of a plot; and
populating the plot with at least one interactive element;
displaying the visualization comprising the at least one interactive element;
obtaining input via the at least one interactive element using a natural motion interface, wherein obtaining the input comprises:
identifying a gesture using the at least one interactive element by tracking movement of an input device associated with the natural motion interface; and
translating the gesture to a modification of the deployment; and
performing an action set, based on the input, to update an operation of the deployment.

7. The method of claim 6, wherein performing the action set comprises:
modifying a deployment description based on the input to obtain an updated deployment description; and
enforcing the updated deployment description on at least one asset of the deployment.

8. The method of claim 7, wherein enforcing the updated deployment description on the at least one asset of the deployment comprising allocating computational resources of the asset to an application hosted by asset.

9. The method of claim 6, wherein performing the action set comprises:
instructing an asset to perform an action based on the modification of the deployment.

10. The method of claim 6, wherein performing the action set comprises:
modifying a deployment description associated with the deployment based on the modification of the deployment.

11. A non-transitory computer readable medium comprising computer readable program code, which when executed by a computer processor enables the computer processor to perform a method for managing a deployment, the method comprising:
obtaining a deployment interface request for the deployment;
in response to obtaining the deployment interface request:
generating a visualization using the enhanced asset map of the deployment and the deployment interface request, wherein generating the visualization comprises:
identifying a dimension of the enhanced asset map of the deployment;
associating the dimension with an axes of a plot; and
populating the plot with at least one interactive element;
displaying the visualization comprising the at least one interactive element;
obtaining input via the at least one interactive element using a natural motion interface, wherein obtaining the input comprises:
identifying a gesture using the at least one interactive element by tracking movement of an input device associated with the natural motion interface; and
translating the gesture to a modification of the deployment; and
performing an action set, based on the input, to update an operation of the deployment.

12. The non-transitory computer readable medium of claim 11, wherein performing the action set comprises:
modifying a deployment description based on the input to obtain an updated deployment description; and
enforcing the updated deployment description on at least one asset of the deployment.

13. The non-transitory computer readable medium of claim 12, wherein enforcing the updated deployment description on the at least one asset of the deployment comprising allocating computational resources of the asset to an application hosted by asset.

* * * * *